United States Patent [19]

Misawa

[11] 4,062,418
[45] Dec. 13, 1977

[54] APPARATUS FOR SUPPORTING LOADS IN A CART

[75] Inventor: Rintaro Misawa, Tokyo, Japan

[73] Assignee: Sunwa Sharyo Manufacturing Company Limited, Tokyo, Japan

[21] Appl. No.: 652,407

[22] Filed: Jan. 26, 1976

[30] Foreign Application Priority Data

Feb. 6, 1975 Japan ............................ 50-17131[U]

[51] Int. Cl.² .............................................. B62B 5/02
[52] U.S. Cl. .................................. 180/8 A; 187/9 R; 280/5.22; 280/47.29
[58] Field of Search ........................... 280/5.22, 47.29; 187/9 R; 180/8 A

[56] References Cited

U.S. PATENT DOCUMENTS 3,578,353  5/1971  Lockhart ..................... 280/47.29 X

FOREIGN PATENT DOCUMENTS 2,362,340  7/1974  Germany ........................... 280/5.22
627,303  8/1959  United Kingdom ..................... 187/9

Primary Examiner—Joseph F. Peters, Jr.
Assistant Examiner—John A. Pekar
Attorney, Agent, or Firm—Martin A. Farber

[57] ABSTRACT

An apparatus for supporting loads in a cart which can ascend the stairway having a load receiving device which is adapted for moving in the longitudinal direction of the cart whereby center of the gravity of the load may be moved.

3 Claims, 4 Drawing Figures

APPARATUS FOR SUPPORTING LOADS IN A CART

The present invention relates to an apparatus for supporting loads in a cart which can ascend the stairway.

An object of the present invention is to provide a cart which may safely ascend a stairway carrying a load. In accordance with the present invention, the cart is provided with a load receiving device which is capable of being longitudinally moved along the frame of the cart for shifting the center of the gravity of the load.

Other objects and advantages of the present invention will be apparent from the following description with reference to the accompanying drawings in which.

Figure 1:
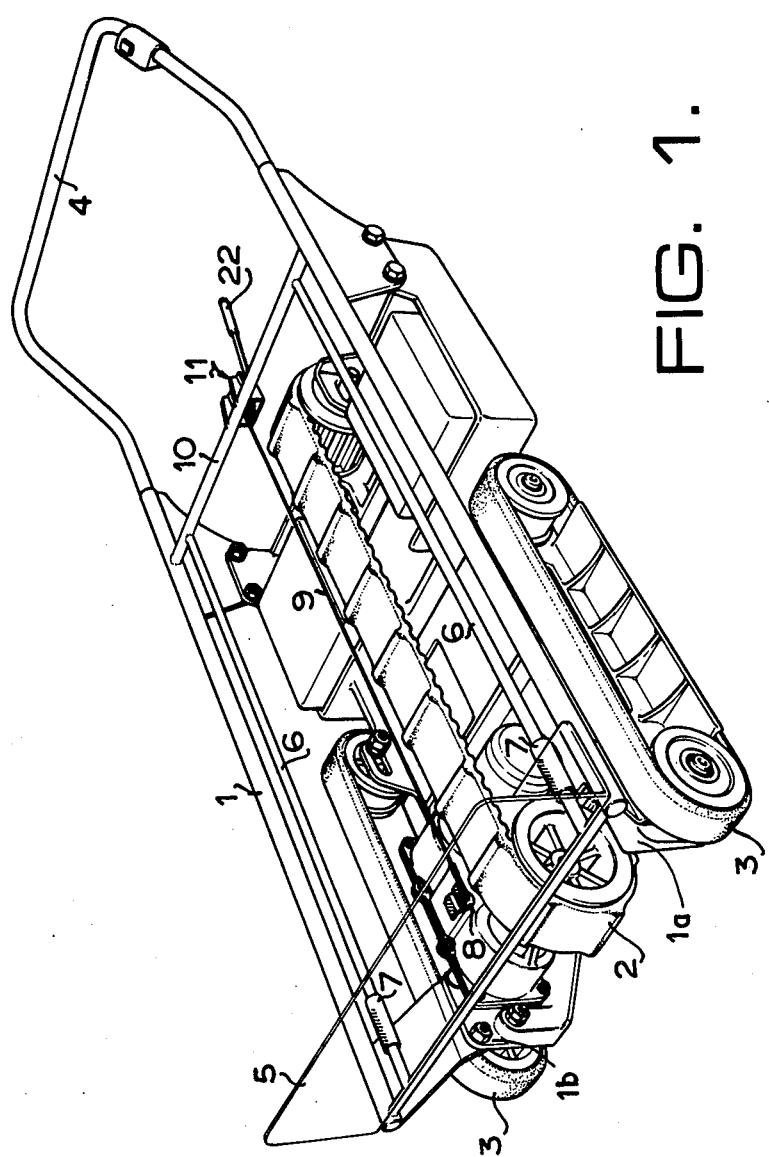
FIG. 1 is a perspective view of the cart according to the present invention.
Figure 2:
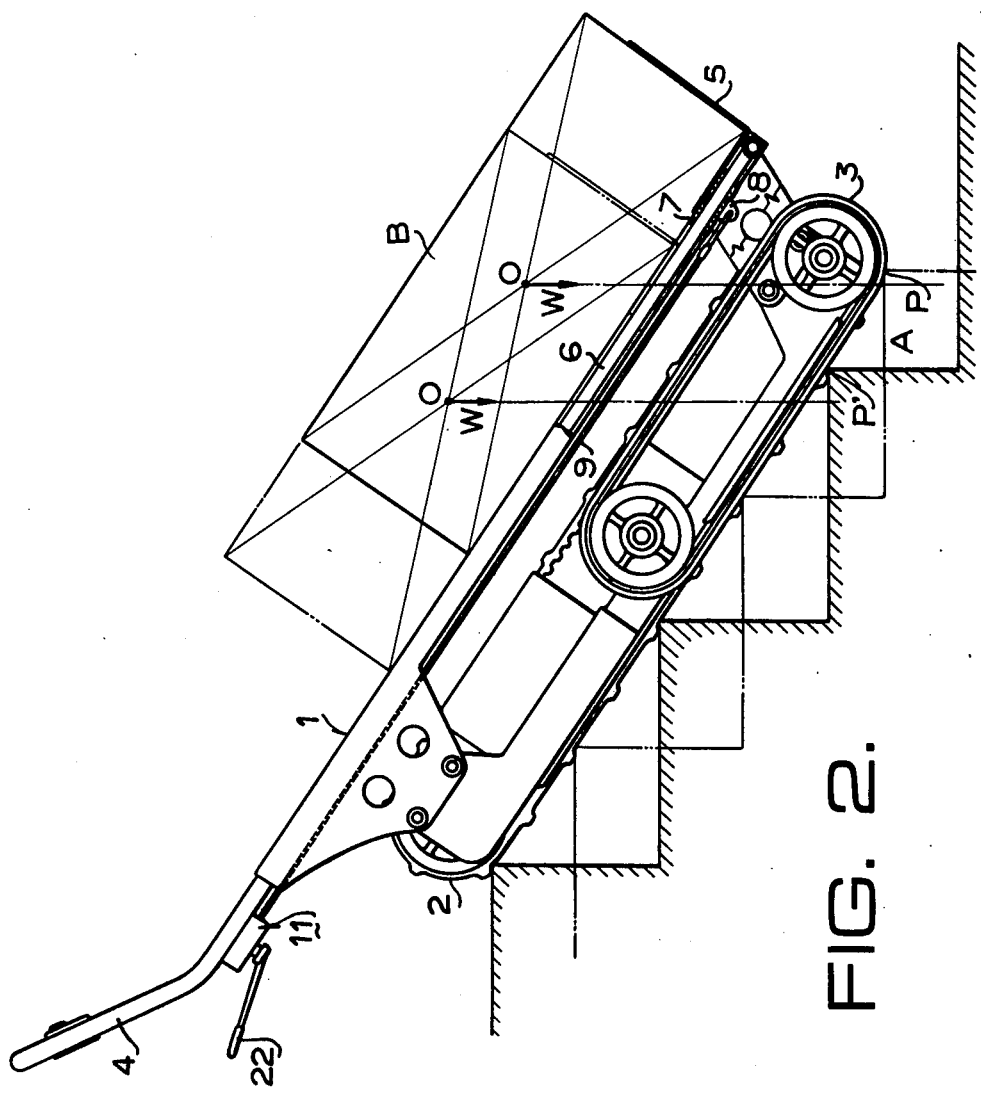
FIG. 2 is a side view of the cart.
Figure 3:
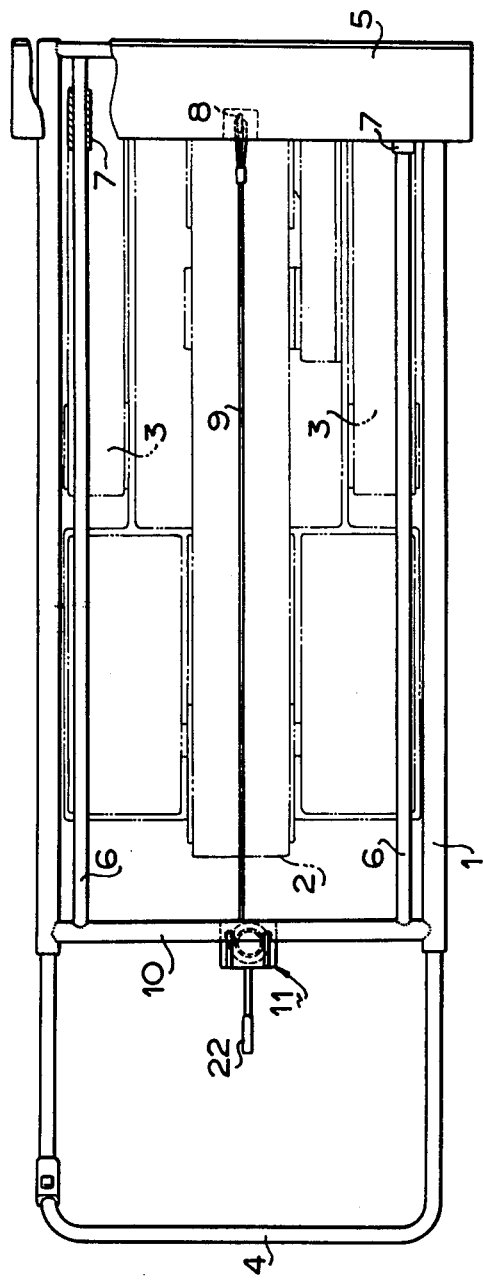
FIG. 3 is a plane view of the cart.

Referring to FIGS. 1 to 3, the cart provided with an apparatus according to the present invention comprises a frame 1, a driving belt crawler 2 provided in the central part of the frame 1, a pair of auxiliary belt crawlers 3 provided in the opposite sides of the frame 1, a handle 4 joined at one end of the frame 1, and a load receiving device 5 provided at the other end of the frame 1. The frame for the belt crawlers 2 and 3 are secured to the brackets 1a and 1b of the frame 1.

As shown in FIG. 2, the cart ascends the stairway with positioning of the handle in the upper position.

When the cart is located in the dotted line position of FIG. 2 where the rear end of each belt crawler engages with the corner of the step A at a contacting point P, a vertical line passing the center O of gravity of the load is located in the inner side of the contacting point P. Thus, there is no danger of overturning of the cart. However, when the cart ascends to the solid line position where the rear portion of the belt crawler engages with the corner at the contacting point P', the line passing the center O of the gravity is located outside of the contact point P'. Thus, the weight W exerted by the load B on the cart tends to rotate it about the point P'. If the rotational force is excessive, the forward portion and hence the handle 4 is raised, which results in an unstable ascending operation. In the worst case, the cart is rearwardly overturned.

The present invention provides an apparatus which may prevent the overturning of the cart ascending the stairway. Describing the details of the apparatus, a pair of parallel guide rails 6 are longitudinally provided in the frame 1 at the opposite sides. The load receiving device 5 comprises a supporting plate having an L-shaped section. Under the supporting plate secured thereto are a pair of pipes 7 which are slidably engaged with the guide rails 6 respectively. One end of a wire 9 is connected to a lug 8 secured to the underside of the supporting plate. The other end of the wire 9 is connected to the drum of a winch 11 secured to the lateral bar 10 provided in the forward portion of the frame 1.

Figure 4:
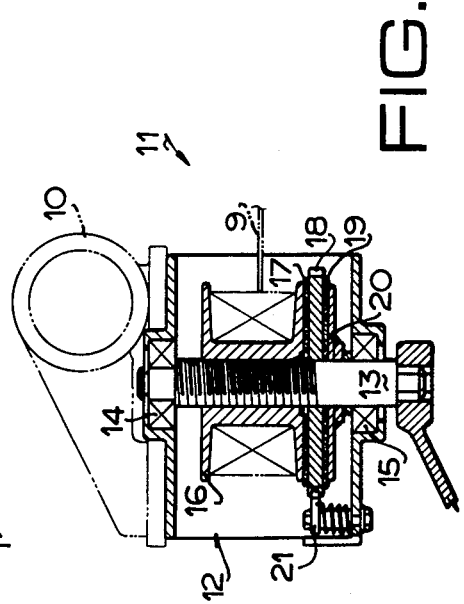
FIG. 4 is a sectional view of a winch used in the cart.

As shown in FIG. 4, the winch 11 has a rotary shaft 13 which is rotatably supported by bearings 14 and 15 in a winch box 12. A winch drum 16 for the wire 9 is screwed on the thread provided on the rotary shaft 13. Further on the rotary shaft 13, brake linings 17 and 19 and a ratchet wheel 18 are rotatably mounted and a disk 20 is securely mounted. A pawl 21 is engaged with teeth formed on the periphery of the ratchet wheel 18. Rotation of the shaft 13 is performed by manually operating a handle 22 secured to the one end thereof. The ratchet wheel 18 and the pawl 21 are so designed that the ratchet wheel can be rotated in the clockwise direction as viewed from the side of the handle 22 without engagement of the pawl 21.

In loading, the load receiving device 5 is located in the rearmost position and the cart is erected upright and maintained in position with the aid of the rear ends of the belt crawlers 2 and 3 and the load receiving device 5. The load B is mounted on the receiving device 5 and then the cart is rotated about the rear end wheels of the belt crawlers into the horizontal normal position. Thus, the load may be easily loaded on the receiving device 5.

As shown in FIG. 2, when the cart ascends the stairway and the vertical line passing the center O of the gravity is located outside of the contacting point P', the winch 11 is operated to wind the wire 9 to move the receiving device 5 upwardly as shown in dotted line. Thus, the center of the gravity now is located inside of the contacting point P', which ensures the safety of ascending operation. If the receiving device 5 is rapidly moved, there occurs a dangerous movement such as pitching action. The winch of the present embodiment is adapted to move the receiving device slowly in accordance with an operation of the handle as described hereinafter.

In winding the wire 9, the handle 22 is clockwisely rotated, thereby the winch drum 16 is moved to the disk 20 so that the brake linings 17 and 19 and ratchet wheel 18 engage each other and press on the disk 20. Thus, the winch drum 16 is rotated with the rotary shaft 13 to wind the wire 9. If the winch drum 16 is rotated in the counter-clockwise direction by the weight of the load B, the winch drum is moved to the disk 20, which causes the ratchet wheel 18 to rotate in the same direction. However, the rotation of the ratchet wheel is arrested by engagement of the pawl 21 so that rotation of the winch drum is prevented by friction between the brake lining 17 and the drum. Therefore, reverse revolution of the winch drum by the weight of the load can be prevented. In drawing out the wire 9, the handle 22 is counter-clockwisely rotated, thereby the winch drum 16 is moved away from the brake lining 17, so that the winch drum 16 is rotated in the counter-clockwise direction by tension of the wire 9. Thus, the wire 9 may be drawn from the drum. The counter-clockwise rotation of the winch drum 16 causes it to move to the brake lining 17. When the winch drum 16 engages with the brake lining 17, the rotation of the drum is prevented and thereby, drawing of the wire stops. Thus, the wire 9 is drawn from the drum little by little according to the rotating the handle 22, so that the load B may be slowly and safely mounted to the rear portion of the frame.

It will be understood that the winch 11 may be substituted with other devices such as an oil hydraulic cylinder, pantograph device or screw device.

From the foregoing, it will be understood that the present invention provides a load supporting apparatus which can move longitudinally on the frame of the cart which ensures the safe ascending of the stairway and that the construction and operation thereof are simple and easy.

What is claimed is:

1. Apparatus for supporting loads in a cart which can ascend a stairway comprising a frame defining a longitudinal axis, belt crawler means provided in said frame for driving and ascending said cart up a stairway, a load receiving device longitudinally slidably mounted on said frame and adapted to receive a load, means for moving said load receiving device in the longitudinal direction of the cart relative to said frame, said load receiving device extensible from a frontward position on the frame, and shiftable rearwardly toward the center of the frame so that the load is balanced relative to said frame during a stairway ascending operation, said belt crawler means including a driving belt crawler disposed longitudinally of said frame and having a driving wheel, a driven wheel and an endless belt operatively engaged with said driving and driven wheels, and having a crawling surface of said endless belt positioned at a lowermost portion of said frame.

2. Apparatus according to claim 1 further comprising a pair of auxiliary belt crawlers including auxiliary endless belts mounted on said frame on opposite sides thereof and having lower surfaces substantially at the level of said crawling surface of said first-mentioned endless belt, the latter being disposed centrally in said frame.

3. Apparatus for supporting loads in a cart which can ascend a stairway comprising a frame defining a longitudinal axis, belt crawler means provided in said frame for driving and ascending said cart up a stairway, a load receiving device longitudinally slidably mounted on said frame, and means for moving said load receiving device in the longitudinal direction of the cart relative to said frame, said moving means comprises, a winch box secured to said frame, a rotary shaft rotatably supported in said winch box and having a screw thread thereon, a winch drum having threading cooperatively engaging said screw thread, a ratchet wheel rotatably mounted on said shaft, said ratchet wheel having teeth on its periphery, two brake linings provided on both sides of said ratchet wheel, respectively, a disc securely mounted on said shaft adjacent one of said brake linings, said drum disposed adjacent the other of said brake linings, a pawl means mounted on said winch box operatively engaging said teeth of said ratchet wheel for preventing rotation of the latter in one direction, a handle connected to said shaft, a wire disposed on said drum and secured to said load receiving device, said screw thread and said ratchet wheel arranged such that rotation of said shaft in one direction for winding the wire on said drum causes said drum to move toward said disc to operatively engage said drum, said ratchet wheel, said brake linings and said disc with each other, and rotation of said drum by weight of the load in the reverse direction to said one direction of said shaft causing said drum to move toward said disc preventing rotation of said ratchet wheel by engagement of said pawl means.

* * * * *